United States Patent
Berthoud

(10) Patent No.: US 12,418,254 B2
(45) Date of Patent: Sep. 16, 2025

(54) CONTROL CIRCUIT OF A STEPPER MOTOR CAPABLE OF DETECTING AN EXTERNAL MAGNETIC FIELD

(71) Applicant: ETA SA Manufacture Horlogere Suisse, Grenchen (CH)

(72) Inventor: Joerg Berthoud, Villeret (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 157 days.

(21) Appl. No.: 18/514,519

(22) Filed: Nov. 20, 2023

(65) Prior Publication Data

US 2024/0186923 A1    Jun. 6, 2024

(30) Foreign Application Priority Data

Dec. 6, 2022 (EP) ..................... 22211700
Dec. 16, 2022 (EP) ..................... 22214282

(51) Int. Cl.
  *H02P 1/02* (2006.01)
  *G04C 3/14* (2006.01)
  *H02P 8/02* (2006.01)
  *H02P 8/08* (2006.01)

(52) U.S. Cl.
  CPC ................. *H02P 8/02* (2013.01); *G04C 3/14* (2013.01); *H02P 8/08* (2013.01)

(58) Field of Classification Search
  CPC ..... H02P 8/08; H02P 8/02; H02P 1/02; G04C 3/14
  USPC ........................................ 318/696
  See application file for complete search history.

(56) References Cited

U.S. PATENT DOCUMENTS

| | | | | | |
|---|---|---|---|---|---|
| 4,103,191 | A | * | 7/1978 | Kawamura | G04C 13/11 968/550 |
| 5,569,990 | A | * | 10/1996 | Dunfield | H02P 6/185 318/400.11 |
| 2004/0070361 | A1 | * | 4/2004 | Carrier | H02K 15/03 318/700 |
| 2012/0170426 | A1 | * | 7/2012 | Honmura | H02K 37/14 368/76 |

(Continued)

FOREIGN PATENT DOCUMENTS

CN  110320790 A  10/2019
JP  2022-099498 A  7/2022

OTHER PUBLICATIONS

European Search Report for EP 22 21 4282 dated Aug. 9, 2023.

*Primary Examiner* — Gabriel Agared
(74) *Attorney, Agent, or Firm* — Sughrue Mion, PLLC

(57) ABSTRACT

A control circuit of a timepiece motor (2), including a bipolar permanent magnet (6), a stator (4) defining two isthmi (12a & 12b) and two rest positions for the rotor, and a coil (18) mounted on the stator. The control circuit can determine the position of the rotor at rest. An electric pulse generator (22) for detecting an external magnetic field formed by a circuits for: measuring the electrical current in the coil after an electrical pulse has been triggered, comparing the measured electrical current with a reference current, measuring the time allowing measuring a rise time between triggering of the electrical pulse and the next time the electrical current flowing in the coil reaches the reference current, and processing the rise time to be able to determine whether the measured rise time indicates the presence of a given external magnetic field passing through the two isthmi.

14 Claims, 10 Drawing Sheets

(56) References Cited

U.S. PATENT DOCUMENTS

| | | | |
|---|---|---|---|
| 2012/0287759 A1* | 11/2012 | Manaka | G04C 3/143 368/80 |
| 2019/0064745 A1* | 2/2019 | Saito | H02P 8/02 |
| 2019/0302698 A1* | 10/2019 | Kawaguchi | G04C 3/143 |
| 2020/0313533 A1* | 10/2020 | Ridge | H02K 1/24 |

* cited by examiner

Fig. 13

| Rest position of the magnet of the rotor | External magnetic field $H_{Ext}$ | Initial flux in the isthmi | Flux genereted by the coil in the isthmi | Rise of the electric current $I_B(t)$ | | Rise time $T_M$ | |
|---|---|---|---|---|---|---|---|
| | | | | Low $F_H$ | Strong $F_H$ | Low $F_H$ | Strong $F_H$ |
| Positive | Zero or Low | $+F_A$ | $+F_B(t)$ | Fast | | Short | |
| | | | $-F_B(t)$ | Slow | | Long | |
| Negative | | $-F_A$ | $+F_B(t)$ | Slow | | Long | |
| | | | $-F_B(t)$ | Fast | | Short | |
| Positive | Strong positive sense of direction | $+F_A +F_H$ | $+F_B(t)$ | Fast | | Short | |
| | | | $-F_B(t)$ | Slow | | Long | |
| Negative | | $-F_A +F_H$ | $+F_B(t)$ | Slow | Fast | Long | Short |
| | | | $-F_B(t)$ | Fast | Slow | Short | Long |
| Positive | Strong negative sense of direction | $+F_A -F_H$ | $+F_B(t)$ | Fast | Slow | Short | Long |
| | | | $-F_B(t)$ | Slow | Fast | Long | Short |
| Negative | | $-F_A -F_H$ | $+F_B(t)$ | Slow | | Long | |
| | | | $-F_B(t)$ | Fast | | Short | |

Fig. 14

| Current Position | -1'600 A/m | -1'200 A/m | -800 A/m | -400 A/m | 0 A/m | 400 A/m | 800 A/m | 1'200 A/m | 1'600 A/m |
|---|---|---|---|---|---|---|---|---|---|
| Pos + +$I_B(t)$ | 1.15 | 0.9 | 0.55 | 0.30 | 0.2 | 0.2 | 0.2 | 0.2 | 0.2 |
| Pos + -$I_B(t)$ | 0.25 | 0.55 | 0.9 | 1.15 | 1.3 | 1.3 | 1.3 | 1.3 | 1.3 |
| Pos - -$I_B(t)$ | 0.2 | 0.2 | 0.2 | 0.2 | 0.2 | 0.30 | 0.55 | 0.9 | 1.15 |
| Pos - +$I_B(t)$ | 1.3 | 1.3 | 1.3 | 1.3 | 1.3 | 1.15 | 0.9 | 0.55 | 0.25 |

Rise time [ms] of $I_B(t)$ to $I_{Ref}$ = 0.10 mA

CONTROL CIRCUIT OF A STEPPER MOTOR CAPABLE OF DETECTING AN EXTERNAL MAGNETIC FIELD

CROSS REFERENCE TO RELATED APPLICATIONS

This application is claims priority to European Patent Application No. 22211700.4, filed on Dec. 6, 2022 and European Patent Application No. 22214282.0, filed on Dec. 16, 2022, the disclosures of which are incorporated by reference herein their entireties

TECHNICAL FIELD OF THE INVENTION

The present invention relates to a control circuit of a stepper motor arranged so as to detect a magnetic field external to the motor and present in the environment of this motor.

In particular, the stepper motor is a timepiece motor, in particular a Lavet-type motor, which is incorporated into an electromechanical movement forming an electronic watch with an analog display.

TECHNOLOGICAL BACKGROUND

The document U.S. Pat. No. 11,176,632 describes an electromechanical watch comprising a Lavet-type stepper motor, having a rotor with a bipolar permanent magnet and a coil mounted on a magnetic circuit formed by the stator, this stator comprising a circular opening for the magnet and defining two diametrically opposed isthmi at the periphery of the opening, these two isthmi separating two poles of the stator guiding a magnetic flux generated by the coil throughout the opening.

The motor is associated with a control circuit which manages the power supply of the coil so as to supply this coil, to drive the rotor in rotation, with series of electrical pulses, each series having electrical pulses with the same polarity and being intended to perform one motor step, the series having alternately a first polarity and a second polarity which are opposed. Depending on the torque necessary to perform each motor step or other constraints applied on the rotor or also disturbances being exerted on the motor, the electrical pulses have variable durations within the series and/or from one series to another. This technique is known and referred to as pulse-width modulation ('PWM'—'Pulse Width Modulation'). One could observe that the number of electrical pulses in one series for performing a motor step varies according to the aforementioned physical events.

The document U.S. Pat. No. 11,176,632 teaches that an external magnetic field, oriented according to the direction defined by the two poles of the stator, affects two parameters of the series of electrical pulses which vary according to the polarity of these series. More particularly, one could observe that the number of electrical pulses and together the maximum duration of these electrical pulses per series vary according to the polarity in the presence of said magnetic field (it being understood that this magnetic field has a strength capable of generating a disturbance in the operation of the motor at least in a given mode, in particular a fast drive mode of the rotor). Thus, it is suggested to detect the presence of a disturbing external magnetic field based on a comparison of either the number of pulses, or the maximum duration of these pulses between series having opposite polarities, i.e. positive and negative polarities.

This technique is relatively complex to implement, as demonstrated in the description of the aforementioned US document, and it is possible only in the case of a control of the motor with the pulse-width modulation technique.

SUMMARY OF THE INVENTION

An objective of the present invention is to provide an electronic control circuit of a stepper motor comprising a circuit for detecting an external magnetic field which is adapted to a control of the motor generating drive pulses of the motor of the continuous type, i.e. at a constant voltage over the duration of each drive pulse of the rotor of this motor (and therefore without "PWM").

Another objective of the present invention is to provide a method for detecting an external magnetic field, via an evolutionary control circuit for a stepper motor, which is effective and relatively not complex, by exploiting a physical phenomenon different from that one taught in the prior art and set out throughout the development having led to the present invention.

The present invention relates to an electronic control circuit of a stepper-type motor, this motor comprising a rotor with a bipolar permanent magnet, having a magnetisation axis perpendicular to the axis of rotation of this rotor, and a stator defining a magnetic circuit and an opening forming a housing for the permanent magnet. The stator also defines two isthmi at the periphery of the opening, which are diametrically opposed in a first direction perpendicular to the axis of rotation, and two rest positions for the rotor in which the permanent magnet is oriented in a second direction, angularly offset from the first direction, respectively in both senses of direction. The permanent magnet generates, in the two rest positions, a first magnetic flux passing through the two isthmi respectively in both senses of direction, a first rest position corresponding, by definition, to a positive sense of direction and the second rest position corresponding to a negative sense of direction of the first magnetic flux. The motor further comprises a coil mounted on the magnetic circuit so as to be able to generate, when supplied with a positive electrical pulse or a negative electrical pulse, a second magnetic flux passing through the two isthmi respectively in said positive sense of direction or in said negative sense of direction. The electrical control circuit comprises means for determining the position of the rotor at rest, from among said first and second rest positions, and an electrical pulse generator associated with an electrical power supply source and arranged so as to be able to selectively supply the coil with positive and negative electrical pulses. In addition, the electronic control circuit comprises a circuit for detecting an external magnetic field formed by a circuit for measuring said electrical current, a circuit for comparing the measured electrical current with a reference current, a time measurement circuit allowing measuring a rise time between triggering of one of said electrical pulses and the next moment in time when the electrical current flowing in the coil reaches the reference current, and a circuit for processing the rise time which is arranged to be able to determine whether the measured rise time indicates the presence of a given external magnetic field passing through the two isthmi.

According to two main variants, the circuit for processing the rise time is arranged so as to be able to determine, at least within a useful range of values, either approximately a strength of the external magnetic field or of its flux passing, where appropriate, through the two isthmi, or whether the strength of said external magnetic field or of its flux passing, where appropriate, through the two isthmi is higher than a reference value.

According to a particular variant, the circuit for processing the rise time is arranged so as to be able to determine, at least within the useful range of values, whether the strength of the external magnetic field or of its flux passing, where appropriate, through the two isthmi is within a specific range of values among a plurality of specific ranges of given values that succeed one another.

According to an advantageous embodiment, the circuit for processing the rise time is arranged so as to be able to determine the sense of direction of the external magnetic field passing, where appropriate, through the two isthmi.

According to a preferred embodiment, the control circuit is arranged so as to detect the presence of a given external magnetic field, so as to generate an electrical pulse in anti-phase with the rest position of the rotor, namely a negative electrical pulse when the rotor is in the positive rest position and a positive electrical pulse when the rotor is in the negative rest position, so that the detection of the external magnetic field cannot cause an advance of the rotor by one step.

Thanks to the features of the invention, it is possible to detect the presence of an external magnetic field based on a rise time of the electrical current in the coil of the motor, up to a given reference duration, after an electrical pulse (detection pulse) has been triggered, which may be relatively short. The conditions of this detection relate to the rest position in which the rotor is when the detection pulse is triggered and to the direction as well as the sense of direction of the external electrical field with respect to the stator, as it will arise more clearly in the following detailed description of the invention.

The invention also relates to an electromechanical movement comprising a stepper-type motor and a control circuit of this motor arranged according to the present invention, the motor comprising a rotor provided with a bipolar permanent magnet (next, also referred to as 'permanent magnet' or 'magnet'), having a magnetisation axis perpendicular to the axis of rotation of this rotor, and a stator defining a magnetic circuit and an opening forming a housing for the permanent magnet. The stator defines two isthmi at the periphery of the opening, which are diametrically opposed in a first direction perpendicular to the axis of rotation, and two rest positions for the rotor in which the permanent magnet is oriented in a second direction, angularly offset from the first direction, respectively in both senses of direction. The permanent magnet generates, in the both rest position, a first magnetic flux passing through the two isthmi in both senses of direction respectively, a first rest position corresponding by definition to a positive sense of direction and the second rest position corresponding to a negative sense of direction of the first magnetic flux. The motor further comprises a coil mounted on the magnetic circuit so as to be able to generate, when supplied with a positive electrical pulse or a negative electrical pulse, a second magnetic flux passing through the two isthmi respectively in said positive sense of direction or in said negative sense of direction. The invention also relates to a watch incorporating an electromechanical movement according to the present invention.

In addition, the invention also relates to a method for detecting an external magnetic field in which a stepper-type motor, in particular a timepiece motor, controlled by an electronic control circuit according to the present invention, is located.

BRIEF DESCRIPTION OF THE FIGURES

The invention will be described hereinafter in more detail with reference to the appended drawings, given as non-limiting examples, wherein:

FIG. 13 is a table giving the evolution of the rise of the electrical current in the coil over time, after an electrical pulse has been triggered, in the various possible magnetic configurations at the two isthmi of the stator, for a zero or weak external magnetic field and for a relatively strong external magnetic field;

FIG. 14 is a table giving durations for the rise time of the electrical current up to a reference intensity, upon triggering of an electrical pulse, as a function of the rest position of the magnet, the polarity of the electrical pulse and various strengths of the external magnetic flux in both senses of direction;

DETAILED DESCRIPTION OF THE INVENTION

With reference to the appended figures, an electronic control circuit 20 of a stepper-type motor 2, in particular of a timepiece motor, will be described, and the physical phenomenon used by a detection circuit 24 arranged so as to detect an external magnetic field surrounding the motor will be set out in details, this detection circuit being incorporated into the electronic control circuit, as well as the method for detecting an external magnetic field implemented by this detection circuit.

Figure 1:
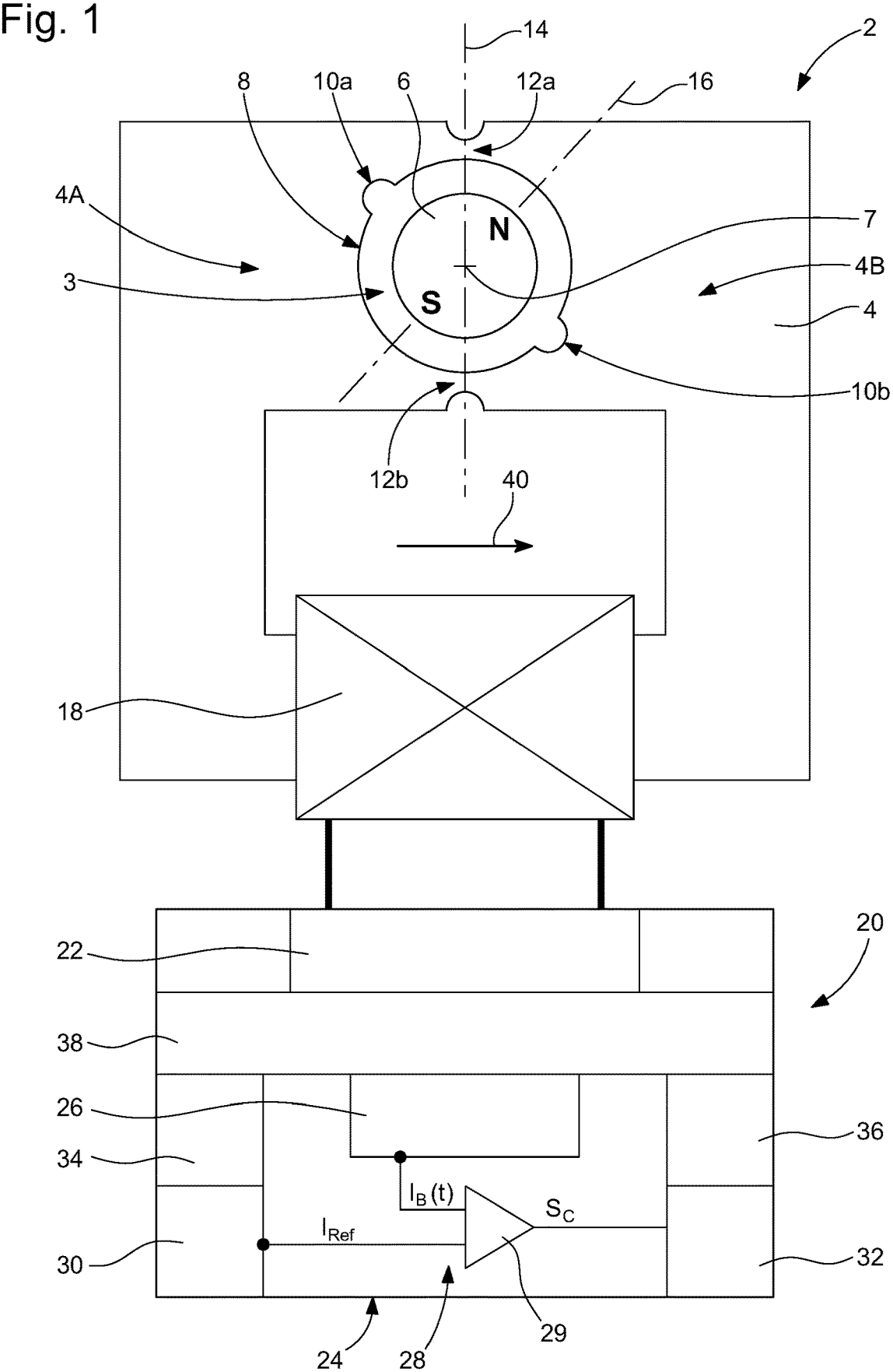
FIG. 1 is a schematic illustration of a timepiece motor, of the stepper and single-phase type, and of a general embodiment of a circuit for controlling this motor according to the invention.
Figure 2:
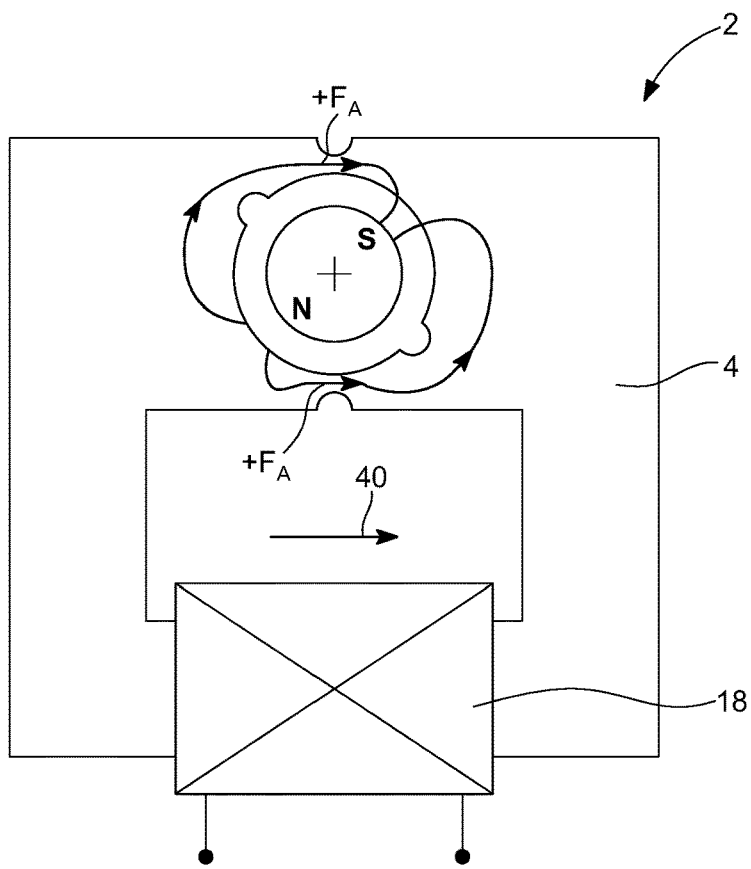
FIG. 2 is a schematic view of the timepiece motor of FIG. 1, schematically showing the magnetic flux of the magnet of the rotor at the two isthmi of the stator.
Figure 3:
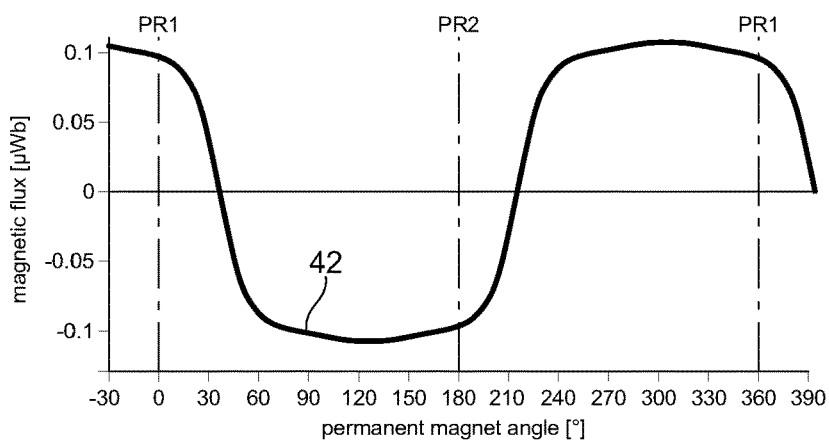
FIG. 3 is a graph giving the curve of the magnetic flux of the magnet of the rotor in the two isthmi of the stator as a function of the angular position of the magnet.

The motor 2 comprises a rotor 3 provided with a bipolar permanent magnet 6, having an axis of magnetisation perpendicular to the axis of rotation 7 of this rotor, and a stator 4 defining a magnetic circuit and an opening 8 which forms a housing for the permanent magnet 6. The stator further defines two isthmi 12a & 12b, diametrically opposed in a first direction 14 perpendicular to the axis of rotation 7, and two stable rest positions for the rotor in which the permanent magnet, namely the axis of magnetisation thereof, is oriented in a second direction 16, angularly offset from the first direction 14, respectively in both senses of direction. The two rest positions are conventionally determined by two diametrically opposed notches 10a & 10b provided on the edge of the opening 8. In each of its two rest positions, the permanent magnet 6 generates a first magnetic flux $F_A$ passing through the two isthmi, in both senses of direction respectively. The isthmi 12a & 12b are arranged so that a magnetic flux that passes through either isthmus passes through this isthmus primarily according to a third direction 40 (shown in FIG. 2) which is orthogonal to the first direction 14. A first rest position, also referred to as a positive rest position, corresponds to a positive sense of direction of the first magnetic flux $F_A$ in the two isthmi, denoted $+F_A$ (FIG. 2), and the second rest position, also referred to as a negative rest position, corresponds to a negative sense of direction of the first magnetic flux $F_A$ in the two isthmi, denoted $-F_A$. FIG. 3 is a graph giving the curve 42 of the magnetic flux $F_A$ as a function of the angular position (counterclockwise direction) of the permanent magnet 6. The positive rest position PR1 of the permanent magnet, the therefore of the rotor, is at 0° and the negative rest position PR2 is at 180°. One could observe that the magnetic flux of the permanent magnet saturates to some extent the two isthmi of the stator in both rest positions. With no magnetic saturation, the curve would be substantially sinusoidal.

Figure 4:
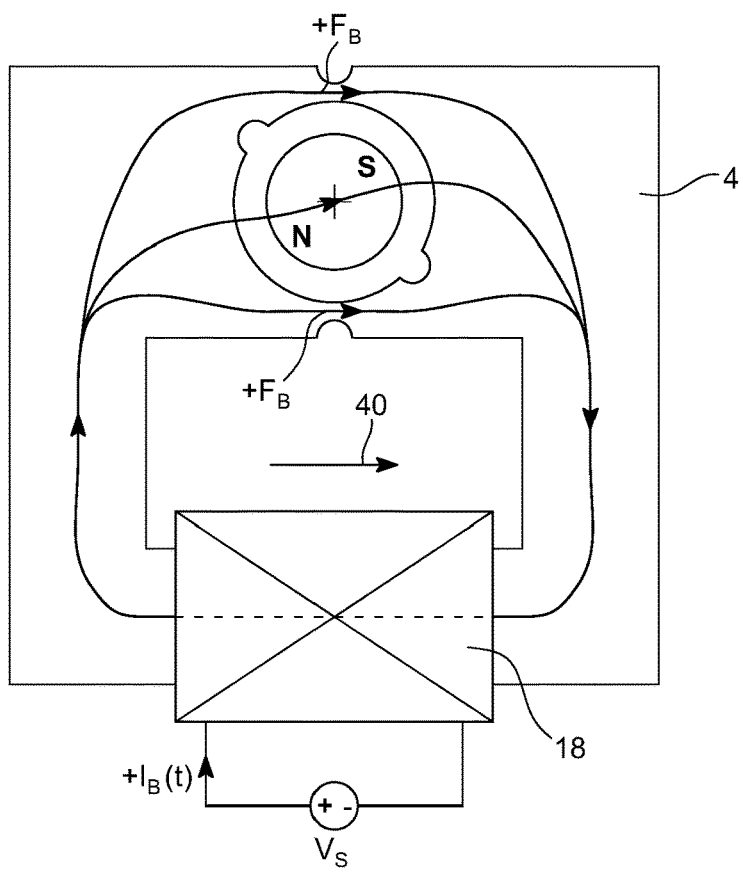
FIG. 4 is a schematic view of the timepiece motor of FIG. 1, schematically showing the magnetic flux generated by the coil during a positive electrical pulse.
Figure 5:
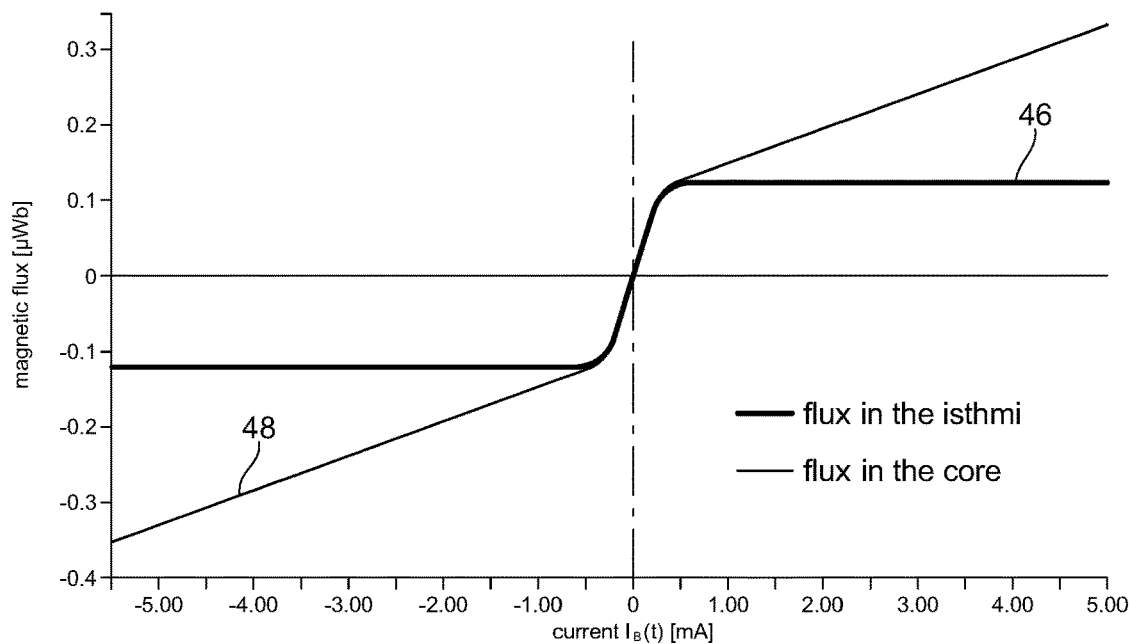
FIG. 5 is a graph giving the two curves of the magnetic flux generated by the electrical current in the coil, negative and positive, respectively in the two isthmi of the stator and in the core of the coil.

The motor 2 further comprises a coil 18 mounted on the magnetic circuit so as to be able to generate, when supplied with a positive electrical pulse $+I_B(t)$ or with a negative electrical pulse $-I_B(t)$, a second magnetic flux $F_B$ passing through the two isthmi, in the illustrated variant primarily according to the third direction 40, respectively in said positive sense of direction $+F_B$ (FIG. 4), and said negative sense of direction $-F_B$. FIG. 5 gives the curve 46 of the magnetic flux $F_B(t)$ generated by the coil 18 in the two isthmi 12a & 12b, in the absence of the magnetic flux of the magnet of the rotor and of other magnetic fluxes, as a function of the intensity of the electrical current $I_B(t)$ in the coil, as well as the curve 48 of the corresponding magnetic flux which propagates in the core of the coil. One could observe that the magnetic flux in the core increases substantially linearly according to the increase of the intensity of the electrical current while the magnetic flux in the isthmi saturates rapidly, already about 0.05 mA. It should be understood from FIGS. 3 and 5 that the magnetic flux generated by the coil in the stator is rapidly higher than that generated by the permanent magnet. This results in that the magnetic flux $F_B$ of the coil 16 imposes the sense of direction of the magnetic flux in the two isthmi after a certain delay has elapsed after an electrical pulse has been triggered, which rapidly reaches saturation (a value of about 100 nWb in the given example) even when the magnetic flux of the magnet $F_A$ is in the opposite sense of direction to that of the coil in the two isthmi.

The electronic control circuit 20 comprises means for determining the position of the rotor at rest, from among the first and second rest positions, and an electrical pulse generator 22 associated with an electrical power source and arranged to be able to selectively supply the coil with positive electrical pulses $+I_B(t)$ and negative electrical pulses $-I_B(t)$, in particular at a voltage between about 1 V and 3 V. The generator 22 is arranged such that it can supply electrical pulses to rotate the rotor (driving pulses), as well as electrical detection pulses (detection pulses), namely for detecting an external magnetic field $H_{Ext}$, as will be explained in more detail later on. In particular, a management circuit 38 manages the generation of the electrical pulses supplied to the coil. It should be noted that electrical driving pulses can also jointly form electrical detection pulses. When not associated with any other qualifier, the term 'electrical pulse' is understood herein to mean electrical detection pulses (detection pulses). The means for determining the positive or negative rest position of the rotor are known to a person skilled in the art and are typically provided in the control circuits of stepper motors for timepieces. The electronic control circuit 20 further comprises a circuit 24 for detecting an external magnetic field $H_{Ext}$ associated with the management circuit 38 and formed by:
- a circuit 26 for measuring the intensity $I_B(t)$ of the electrical current flowing in the coil;
- a circuit 28 for comparing the intensity $I_B(t)$ of the measured electrical current with a reference current $I_{Ref}$;
- a time measurement circuit 32 allowing measuring a rise time $T_M$, between triggering of each of the electrical detection pulses and the next moment in time when the intensity $I_B(t)$ of the electrical current flowing in the coil reaches the reference current $I_{Ref}$; and
- a circuit 36 for processing the rise time which is arranged so as to be able to determine whether the measured rise time $T_M$ indicates the presence, during the considered electrical detection pulse, of a given external magnetic field $H_{Ext}$ passing through the isthmi 12a & 12b according to the third direction 40 (which results from the configuration of the isthmi which define two narrowings, for the magnetic flux in the stator, oriented tangential to the opening 8 which is generally circular).

In particular, the comparison circuit 28 comprises a comparator 29 which receives, as input, after an electrical detection pulse has been triggered, the intensity $I_B(t)$ of the electrical current in the coil, which is supplied by the measurement circuit 26, and the reference current $I_{Ref}$, supplied by a memory 30, and which outputs a comparison signal $S_C$ indicating whether the intensity $I_B(t)$ is higher than the reference value $I_{Ref}$. The detection circuit 24 comprises a time base 34 which supplies a relatively high clocking signal, for example equal to or higher than 500 kHz, on the one hand to allow monitoring the intensity $I_B(t)$ of the measured electrical current in near-real time and, on the other hand, to accurately determine the rise time $T_M$ by the measurement circuit 32 (timer 32).

Figure 8:
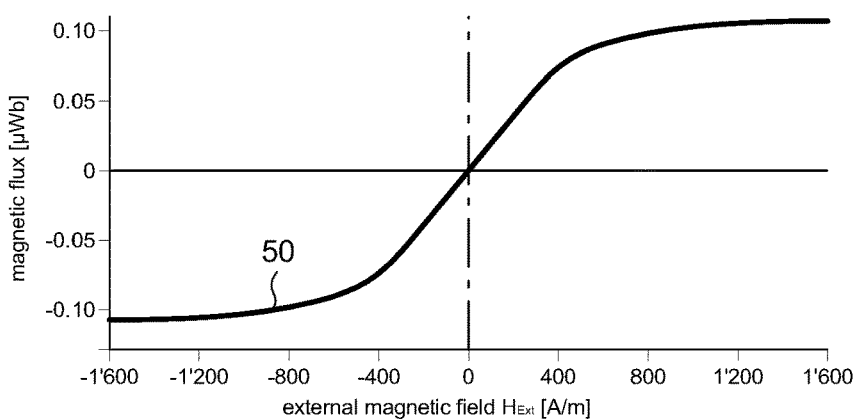
FIG. 8 is a graph giving the curve of the external magnetic flux passing within the two isthmi of the stator as a function of the strength of the external magnetic field, in the absence of the other magnetic fluxes
Figure 6:
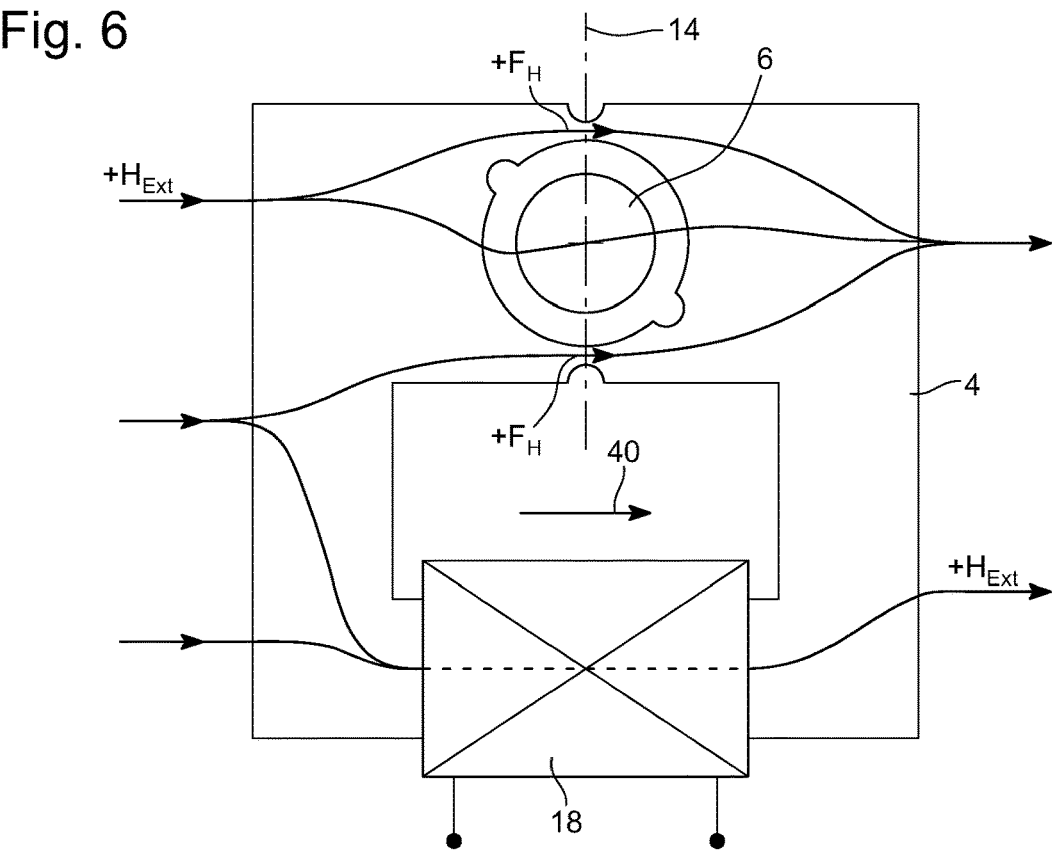
FIG. 6 is a schematic view of the timepiece motor of FIG. 1, schematically showing the circulation of an external magnetic field within the stator, this external magnetic field propagating according to a general direction located in the plane of the stator and orthogonal to the direction of alignment of the two isthmi and in the positive sense of direction.
Figure 7:
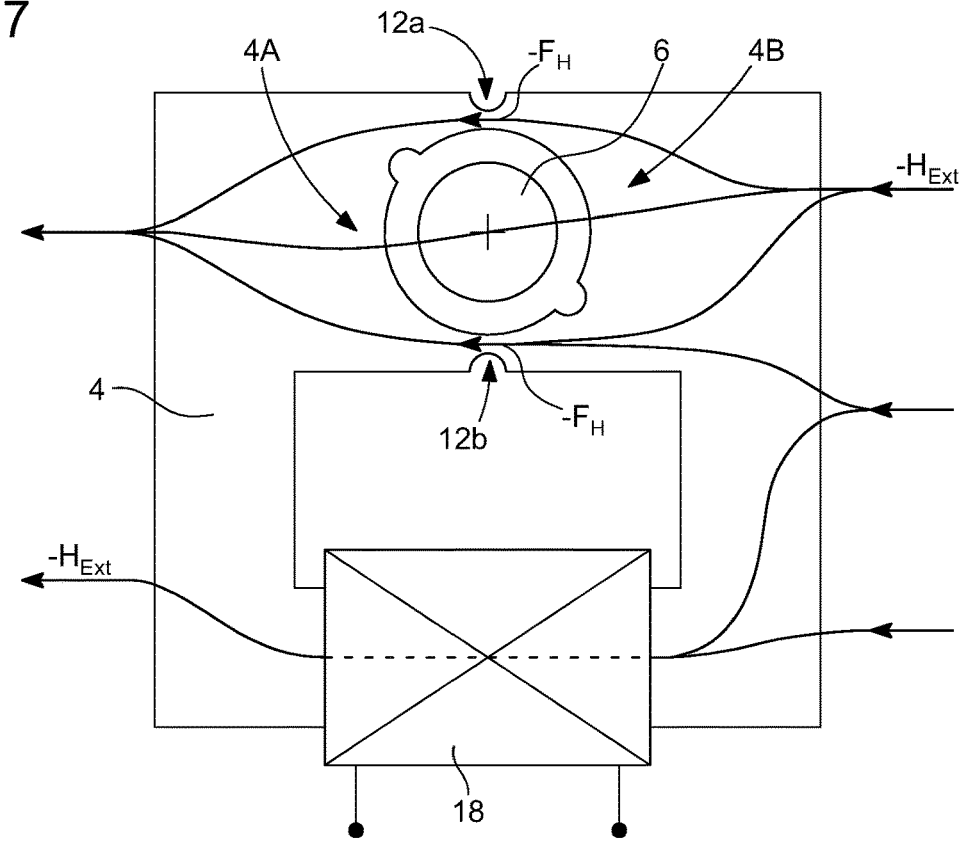
FIG. 7 is a schematic view of the timepiece motor of FIG. 1 similar to that of FIG. 6, but for a negative sense of direction of the external magnetic field according to the aforementioned general direction.
Figure 9A:
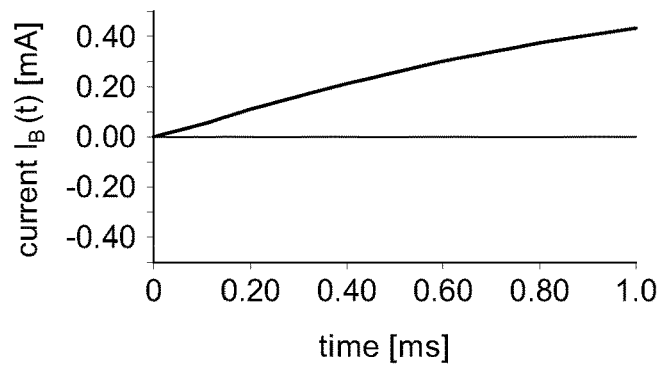
FIGS. 9A to 9D show four curves of the evolution of the electrical current in the coil, after an electrical pulse has been triggered, as a function of various conditions for the rest position of the magnet and the polarity of the electrical pulse, in the absence of any external magnetic field.
Figure 9B:
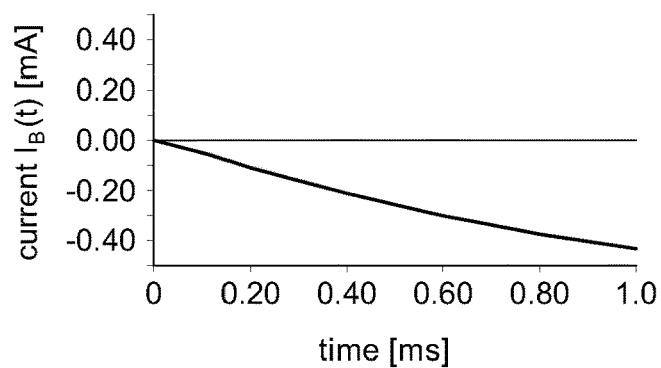
Figure 9C:
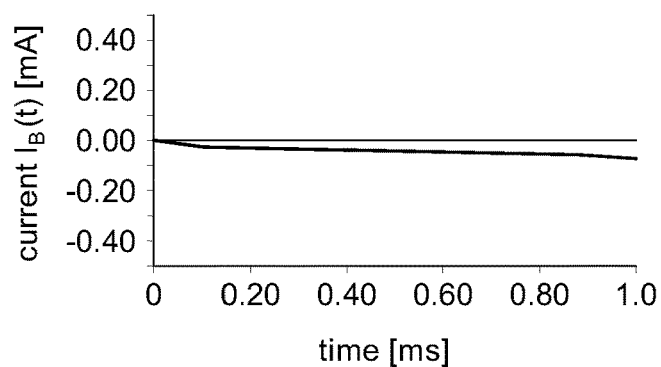
Figure 9D:
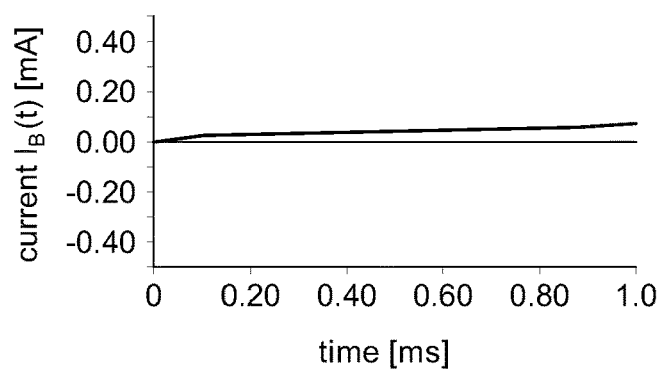
Figure 10A:
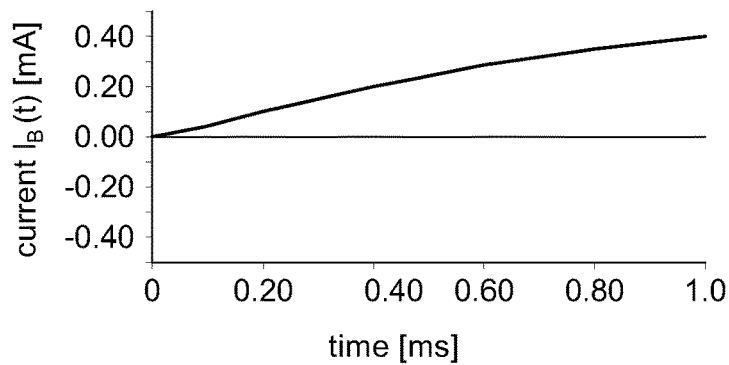
FIGS. 10A to 10D respectively show four curves of the evolution of the electrical current in the coil, after an electrical pulse has been triggered, as a function of various conditions for the rest position of the magnet and the polarity of the electrical pulse, in the presence of an external magnetic field with a positive sense of direction, as shown in FIG. 6.
Figure 10B:
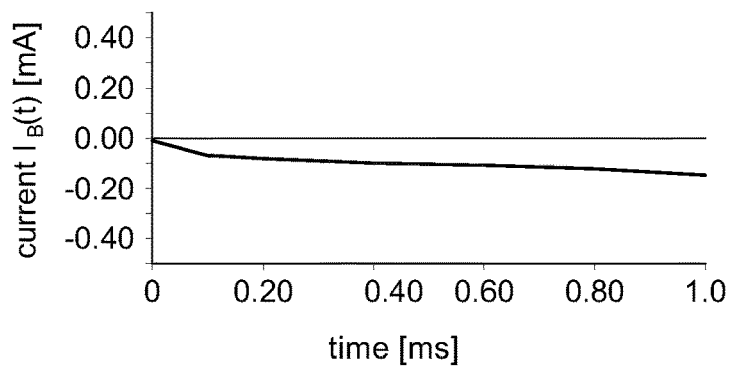
Figure 10C:
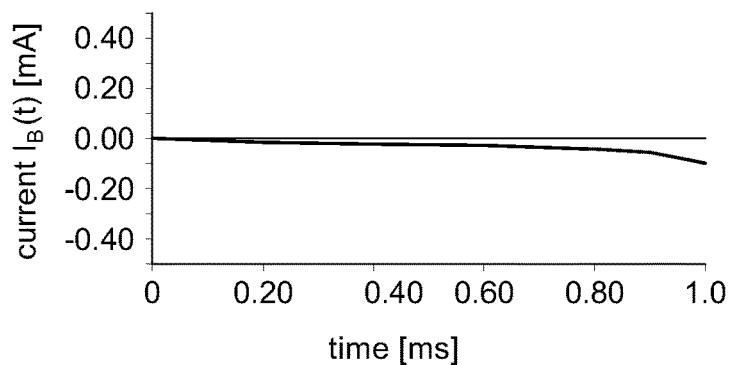
Figure 10D:
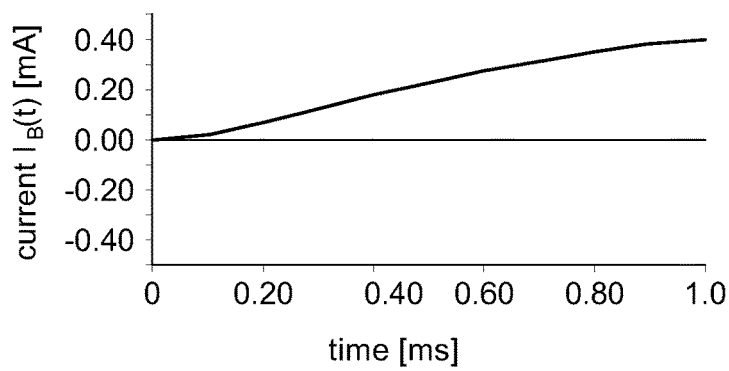

FIGS. 6 and 7 show an external magnetic field $H_{Ext}$ whose main component propagates in the general plane of the stator according to the direction 40, i.e. according to a direction orthogonal to the direction 14 of alignment of the two isthmi 12a & 12b, respectively in a positive sense of direction, generating a magnetic flux $+F_H$ in the two isthmi, and in a negative sense of direction, generating a magnetic flux $-F_H$ in the two isthmi. It should be noted that it is the magnetic flux $F_H$, referred to as the 'external magnetic flux' that is important for the method for detecting the external magnetic field $H_{Ext}$, which magnetic flux passes within the two isthmi, namely which passes through these two isthmi between two pole parts 4A and 4B of the stator 4. FIG. 8 gives the curve 50 of the magnetic flux $F_H$ in the two isthmi of the stator as a function of the strength of the external magnetic field $H_{Ext}$ in the negative sense of direction and the positive sense of direction, in the absence of any other magnetic fields. One could observe that the external magnetic flux saturates the two isthmi when the strength of the external magnetic field increases. The strength of the external magnetic field $H_{Ext}$ considered in the embodiment described herein is in the range of 1,000 A/m, namely up to about 2,000 A/m. Nonetheless, the detection method according to the invention is not limited to external magnetic fields below this value of 2,000 A/m.

FIGS. 9A to 9D show four curves of the evolution of the electrical current in the coil over time, after an electrical detection pulse has been triggered, respectively for a positive rest position and a negative rest position of the rotor and, for each of these two rest positions, a positive electrical pulse and a negative electrical pulse, without the presence of an external magnetic field in the isthmi. In the context of the development of an electronic control circuit of a stepper-type motor having led to the present invention, the Inventor has made the observations set out hereinafter. When the flux $F_A$ of the permanent magnet in the two isthmi has the same sense of direction as the flux $F_B$ of the coil in these two isthmi, either a positive rest position and a positive electrical current (FIG. 9A), or a negative rest position and a negative electrical current (FIG. 9B), the electrical current $I_B(t)$ increases relatively rapidly after an electrical pulse has been triggered (we will talk about a fast increase of the electrical current and a rise time $T_M$ to a reference current $I_{Ref}$ which is fast). On the contrary, when the flux $F_A$ of the permanent magnet in the two isthmi has a sense of direction opposite to that of the flux $F_B$ of the coil in these two isthmi, either a positive rest position and a negative electrical current (FIG. 9C), or a negative rest position and a positive electrical current (FIG. 9D), the electrical current increases relatively slowly after an electrical pulse has been triggered (we will talk about a slow increase of the electrical current and a rise time $T_M$ to a reference current $I_{Ref}$ which is slow).

Four curves of the evolution of the electrical current $I_B(t)$ in the coil over time are shown in FIGS. 10A to 10D, after a detection pulse has been triggered, respectively for the four configurations of FIG. 9A to 9D and relatively positive external magnetic field $H_{Ext}$, namely $+H_{Ext}=+1,600$ A/m, generating a relatively strong and positive, namely $+F_H$, external magnetic flux in the two isthmi. One could observe that when the electrical current and the external magnetic field have the same sign, i.e. when the magnetic flux $F_B$ of the coil and the external magnetic flux $F_H$ have the same sense of direction (herein positive), the electrical current $I_B(t)$ increases relatively rapidly after an electrical pulse has been triggered, independently of the fact that the permanent magnet 6 is in its positive or negative rest position. On the contrary, when the electrical current and the external magnetic field have opposite signs, i.e. the magnetic flux $F_B$ of the coil (herein negative) and the external magnetic flux $F_H$ (herein positive) have opposite senses of direction, the electrical current $I_B(t)$ increases relatively slowly after an electrical pulse has been triggered, independently of the fact that the permanent magnet is in its positive or negative rest position.

Hence, one could notice that there is a change in the evolution of the electrical current $I_B(t)$ flowing in the coil, after an electrical pulse supplied to this coil has been triggered, in the presence of a relatively strong external magnetic flux $F_H$ passing through the two isthmi of the stator 4 and having a sense of direction that is the opposite of that of the magnetic flux $F_A$ generated by the permanent magnet 6 of the rotor 3, thus when the external magnetic field is positive and the permanent magnet/the rotor is in the negative rest position (FIGS. 10B and 10D) or when the external magnetic field is negative and the permanent magnet/the rotor is in the positive rest position. More specifically, when the permanent magnet of the rotor is in-phase with the electrical detection pulse (case corresponding to a flux $F_A$ of the magnet of the same sense of direction/sign as the magnetic flux $F_B$ generated by the coil), the intensity $I_B(t)$ of the electrical current increases rapidly in the absence of any external magnetic field $H_{Ext}$ but increases slowly in the presence of an external magnetic field generating a relatively strong external magnetic flux $F_H$ of the opposite sense of direction/sign to that of the magnet of the rotor. Hence, a rise time $T_M$ for the electrical current $I_B(t)$ becomes long in the presence of a relatively strong external magnetic field $H_{Ext}$ under the aforementioned conditions, as the rise in the electrical current IB (t) under these conditions changes from 'fast' to 'slow'.

Conversely, when the permanent magnet of the rotor is in anti-phase with the electrical detection pulse (case corresponding to a flux $F_A$ of the magnet of the opposite sense of direction/sign to that of the magnetic flux $F_B$ generated by the coil), the intensity $I_B(t)$ of the electrical current increases slowly in the absence of any external magnetic field $H_{Ext}$ but increases rapidly in the presence of an external magnetic field generating a relatively strong external magnetic flux $F_H$ of the opposite sense of direction/sign to that of the magnet of the rotor. Hence, a rise time $T_M$ for the electrical current $I_B(t)$ becomes short in the presence of a relatively strong external magnetic field $H_{Ext}$ under the aforementioned conditions, as the rise in the electrical current $I_B(t)$ under these conditions changes from 'slow' to 'fast'. The method for detecting an external magnetic field according to the invention is based on this physical phenomenon and on measuring the rise time $T_M$ knowing the rest position of the rotor (information required to supply electrical driving pulses) at the time at which an electrical detection pulse is triggered, the polarity whereof is obviously known (namely whether it is a positive or a negative electrical pulse, this information being given upon generation of any electrical pulse).

Figure 11A:
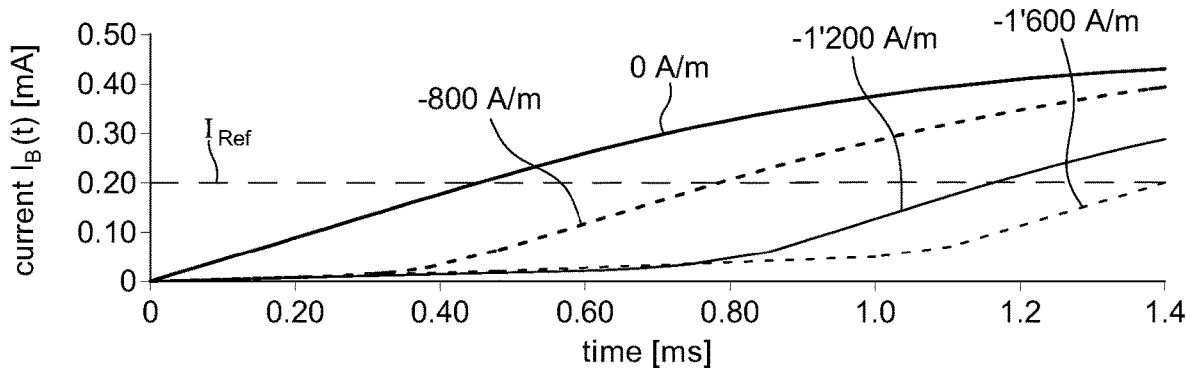
FIGS. 11A & 11B are two graphs showing curves of the evolution of the electrical current in the coil, after an electrical pulse has been triggered, for the magnet in its positive rest position and an in-phase electrical pulse (positive polarity) respectively for the two negative and positive senses of direction of an external magnetic field according to FIGS. 6 & 7, depending on various strengths of this external magnetic field.
Figure 11B:
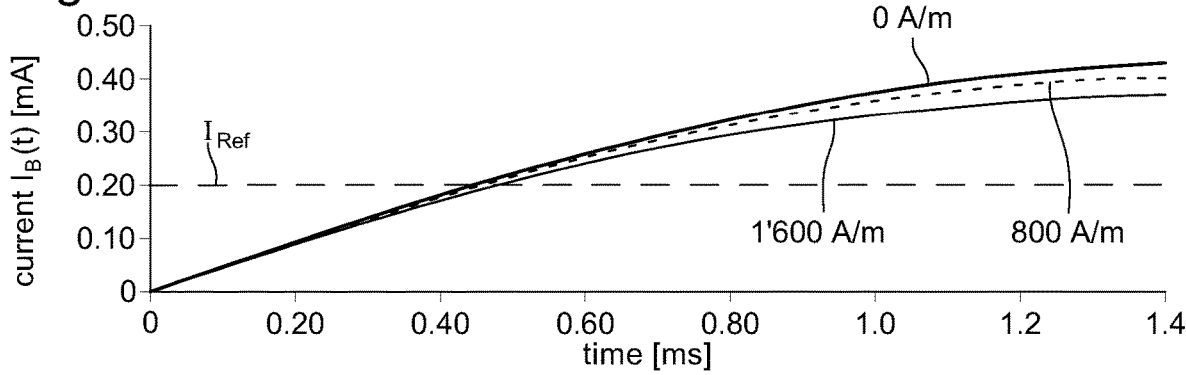
Figure 12A:
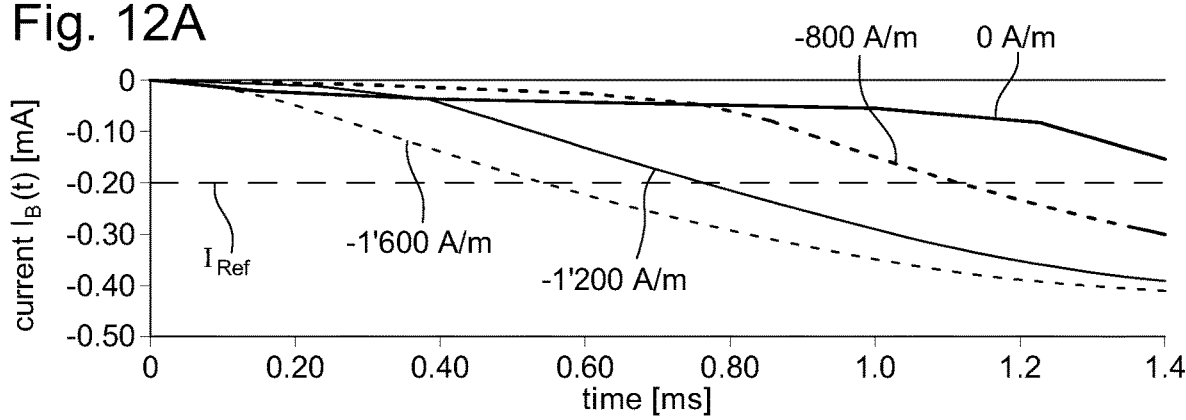
FIGS. 12A & 12B are two graphs showing curves of the evolution of the electrical current in the coil, after an electrical pulse has been triggered, for the magnet in its positive rest position and an anti-phase electrical pulse (negative polarity) respectively for the two negative and positive senses of direction of an external magnetic field according to FIGS. 6 & 7, depending on various strengths of this external magnetic field.
Figure 12B:
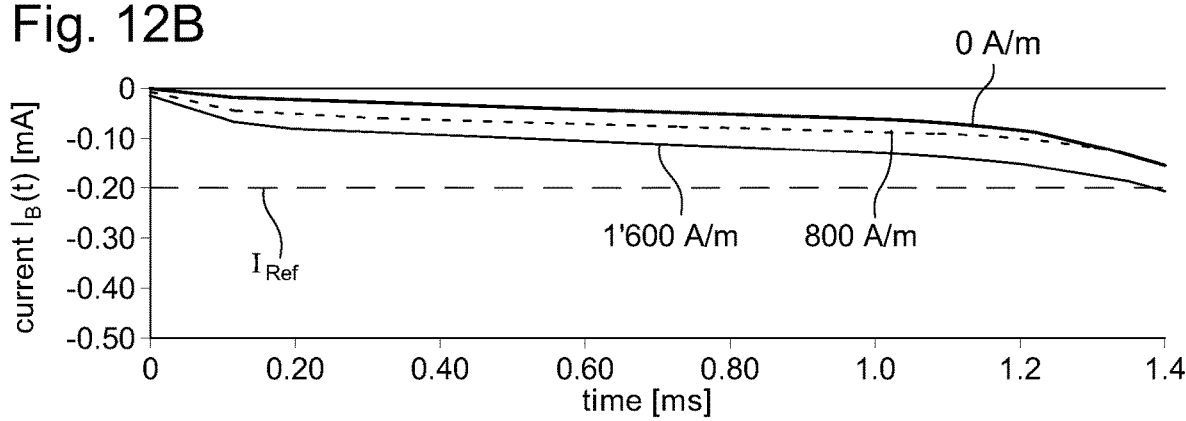

FIGS. 11A and 11B show curves of the evolution of the electrical current $I_B(t)$ in the coil over time, with the permanent magnet in its positive rest position for electrical pulses in-phase, and therefore positive pulses, and an external magnetic field that is respectively negative and positive for various strengths of the external magnetic field. FIG. 11A shows the physical phenomenon described that has just been described for a negative external magnetic field. FIG. 11B shows that the electrical current in the coil undergoes almost no variation over time, and remains fast, when the external magnetic field has the same sense of direction/sign as the rest position of the permanent magnet, i.e. when the external magnetic flux $F_H$ and the magnetic flux $F_A$ of the magnet in the two isthmi have the same sense of direction, and therefore the same sign. FIGS. 12A and 12B show curves showing the evolution of the electrical current $I_B(t)$ in the coil over time, with the permanent magnet also in its positive rest position, but for electrical pulses in anti-phase, and therefore negative pulses, and an external magnetic field that is respectively negative and positive for various strengths of the external magnetic field. FIG. 12A shows the physical phenomenon that has just been described. FIG. 12B again shows that the electrical current $I_B(t)$ in the coil varies very little over time and remains slow, when the external magnetic field has the same sign as the rest position of the permanent magnet.

The table of FIG. 13 summarises the observations made and the specific findings in relation to the rise in the electrical current $I_B(t)$ in the coil 18 and the rise time $T_M$ to reach the reference current $I_{Ref}$ when an electrical detection pulse is triggered. The table of FIG. 14 reproduces the finding of FIG. 13 in another form and in a numerical manner, with various values of the external magnetic field. A physical explanation could be given when to the variation, or non-variation, of the rise time $T_M$ according to the initial conditions for the rest position of the permanent magnet and the polarity of the electrical detection pulses in the presence, or not, of a relatively strong external magnetic field and more generally when the strength of this external magnetic field increases progressively. The equation of the electrical current $I_B(t)$ in the coil as a function of a voltage VS applied to the coil, which is mounted on the magnetic circuit formed by the stator, comprises a second term which is relates to the voltage induced by a variation of the electrical current. As a first approximation, we have the following equation for the electrical current:

$$V_S = R \cdot I_B(t) + L \cdot dI_B(t)/dt$$

where VS is the constant voltage applied to the coil, R is the electrical resistance of the coil and L is the inductance of this coil.

The inductance L of the coil is related to the magnetic permeance (the inverse of the magnetic reluctance) of the magnetic circuit which is defined by the stator and which comprises a core on which the coil is mounted. Yet, the magnetic permeance of the magnetic circuit, formed by the stator for the coil, varies according to the degree of magnetic saturation of the two isthmi 12a & 12b. Thus, the inductance L of the coil also varies according to the degree of magnetic saturation of the two isthmi. More specifically, when the two isthmi are not or barely saturated, the inductance L is relatively high and when the two isthmi are highly or completely saturated, this inductance L is relatively low. This results in that the aforementioned equation of the voltage is as follows: For a given supply voltage VS, when the inductance L is high, the variation of the electrical current over time $dI_B(t)/dt$ is slow, and when the inductance L is relatively low, the variation of the electrical current over time $dI_B(t)/dt$ is relatively fast. Thus, with a high inductance L, the rise time $T_M$ of the electrical current $I_B(t)$ to a given reference current $I_{Ref}$ is relatively long. Conversely, with a low inductance L, the rise time $T_M$ of the electrical current $I_B(t)$ to a given reference current $I_{Ref}$ is relatively short.

The previously-described physical phenomenon is used in the context of the invention to detect an external magnetic field $H_{Ext}$, as described before. To understand the results given in the tables of FIGS. 13 and 14, it should be pointed out at first that the magnet magnetic flux $F_A$ in the isthmi 12a & 12b should magnetically saturate these two isthmi at a significant level, in both rest positions thereof. This is generally the case in a timepiece motor with a bipolar permanent magnet, in particular of the Lavet type (corresponding to that one shown in the figures and described before). Afterwards, the detected external magnetic field $H_{Ext}$ should generate an external magnetic flux $F_H$ in the two isthmi having at least the same order of magnitude as the magnetic flux $F_A$ of the permanent magnet, preferably an intensity higher than $F_A$, so that the superposition of these two magnetic fluxes, when they have opposite senses of directions, either significantly reduces the reluctance of the magnetic circuit, or has a sense of direction of the resultant magnetic flux in the two isthmi that is inverted with respect to the magnetic flux $F_A$ (this second case being preferred). Finally, the coil is arranged so as to supply, at least after a time interval shorter than the duration of the electrical detection pulses, a magnetic flux $F_B(t)$ in the two isthmi which is also at least in the order of magnitude of the magnetic flux $F_A$ of the magnet, preferably higher than $F_A$. In practice, in a timepiece motor with a bipolar permanent magnet, to be able to drive the rotor in rotation, the magnetic flux $F_B(t)$ alone strongly saturates the two isthmi after a given initial time interval, as indicated by the curve 46 in FIG. 5.

The results of Tables 13 and 14 are explained as follows: In the absence of any external magnetic flux $F_H$, when the electrical current $I_B(t)$ is in-phase with the rest position of the permanent magnet (the same sense of direction of the magnetic flux in the two isthmi and therefore the same sign), this electrical current only increases the magnetic saturation of the two isthmi which has already been initially saturated at a relatively high level. Thus, the inductance L(t) remains low throughout the electrical detection pulse and the rise time $T_M$ is short. Conversely, when the electrical current $I_B(t)$ is in anti-phase with the rest position of the permanent magnet (opposite senses of direction of the magnetic fluxes in the two isthmi and therefore opposite signs), the magnetic flux $F_B(t)$ of the coil decreases at least momentarily, in an initial time interval of the electrical detection pulse, the magnetic saturation in the two isthmi (it should be noted that the saturation generally becomes high again after the initial time interval and even higher with a reversal of the sense of direction of the magnetic flux in the two isthmi which is caused by the magnetic flux $F_B(t)$). Thus, during the initial time interval, the inductance L(t) of the coil increases and even becomes high for a short time, which results in the rise time $T_M$ of the electrical current being long. Hence, the evolution of the inductance over time, and not only an end situation at the end of an electrical pulse, should be considered to understand the obtained results.

In the presence of an external magnetic field $H_{Ext}$, when the external magnetic flux $F_H$ has the same sense of direction/sign as the magnetic flux $F_A$ of the permanent magnet, the situation is actually substantially similar to that one described in the previous paragraph because the external magnetic field slightly increases the initial magnetic saturation due to the magnet, which is already relatively high. Thus, the external magnetic field $H_{Ext}$ does not significantly change the evolution of the inductance L(t) during the electrical detection pulse, at most it introduces a slight delay (time offset) in the temporary increase of the inductance L(t) when the permanent magnet and the electrical detection pulse are in anti-phase, which is reflected by a slight initial increase of the electrical current $I_B(t)$ in the coil. On the contrary, when the external magnetic flux $F_H$ has a sense of direction opposite to that of the magnetic flux $F_A$ of the permanent magnet, this external magnetic flux $F_H$ changes the initial conditions regarding the magnetic saturation in the wo isthmi and/or the initial sense of direction of the initial total magnetic flux in these two isthmi, so that the evolution of the inductance L(t) over time is significantly modified for the two polarities of the electrical detection pulses when the strength of the external magnetic field $H_{Ext}$ becomes high enough, and that being so at least within a useful range of values for the strength of the external magnetic field.

In particular, when the electrical pulse is in-phase with the rest position of the rotor, an external magnetic field generating a magnetic flux $F_H$ in the two isthmi with a sense of direction opposite to the magnetic flux $F_A$ of the permanent magnet results in that the magnetic flux $F_B(t)$ of the coil will at least momentarily reduce the magnetic saturation and thus increase the inductance L(t), so that the rise time $T_M$ will increase, and that being so progressively with the increase in the strength of the external magnetic flux $F_H$ at least within a given range of values for this strength between the zero value and a determined maximum value. In the example given in FIG. 14, the considered maximum value is equal to about 2,000 A/m. When the electrical pulse is in anti-phase with the rest position of the rotor, an external magnetic field generating an external magnetic flux $F_H$ in the two isthmi with a sense of direction opposite to the magnetic flux $F_A$ of the permanent magnet results in that the magnetic flux $F_B(t)$ of the coil will at least reduce and even cancel, when the external magnetic flux $F_H$ has a sufficiently high strength, the decrease of the magnetic saturation in the isthmi which occurs in the absence of the external magnetic flux $F_H$ and thus reduce the inductance L(t) at least momentarily during the electrical detection pulse, so that the rise time $T_M$ will decrease, and that being so progressively with the increase in the strength of the external magnetic flux $F_H$ at least within a given range of values of this strength.

An important observation is made from the disclosure hereinabove, namely, when the rotor/the permanent magnet is in the negative rest position, only an external magnetic field generating a positive external magnetic flux $F_H(+F_H)$, within a useful range of values of its strength, can be easily detected on the basis of the rise time $T_M$, and that, when the rotor/the permanent magnet is in the positive rest position, only an external magnetic field generating a negative external magnetic flux $F_H(-F_H)$, in a useful range of values of its strength, can be easily detected on the basis of the rise time $T_M$.

Figure 15:
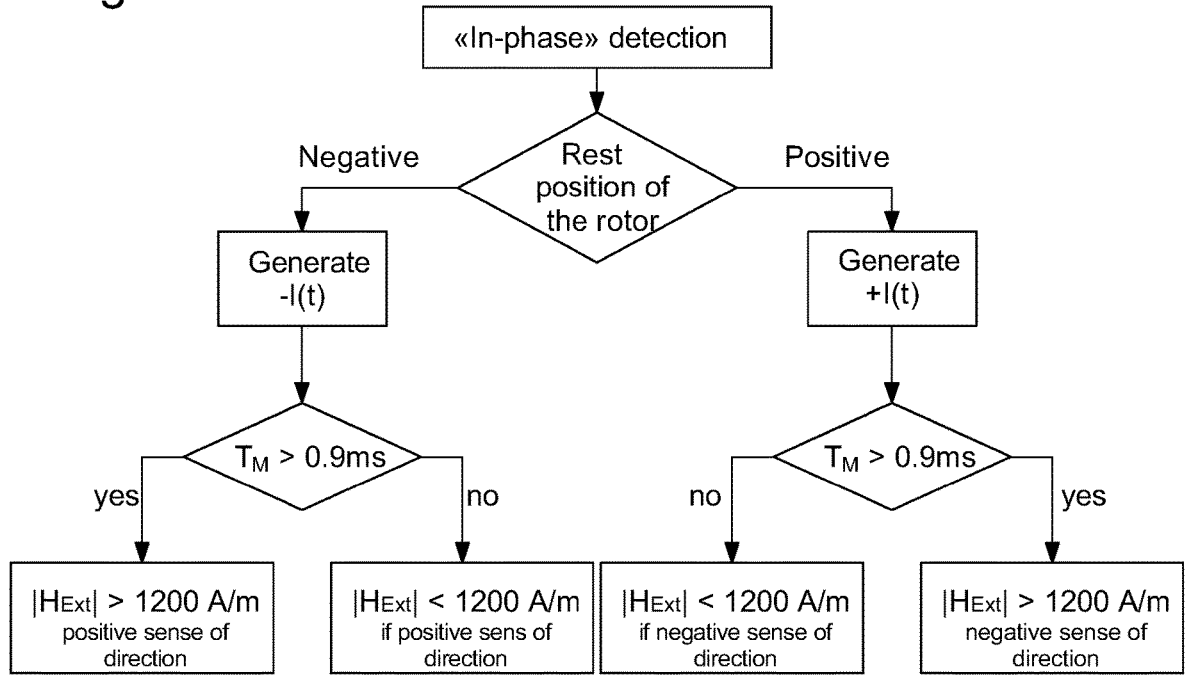
FIG. 15 is a diagram disclosing a method for detecting a given external magnetic field for an in-phase electrical pulse.
Figure 16:
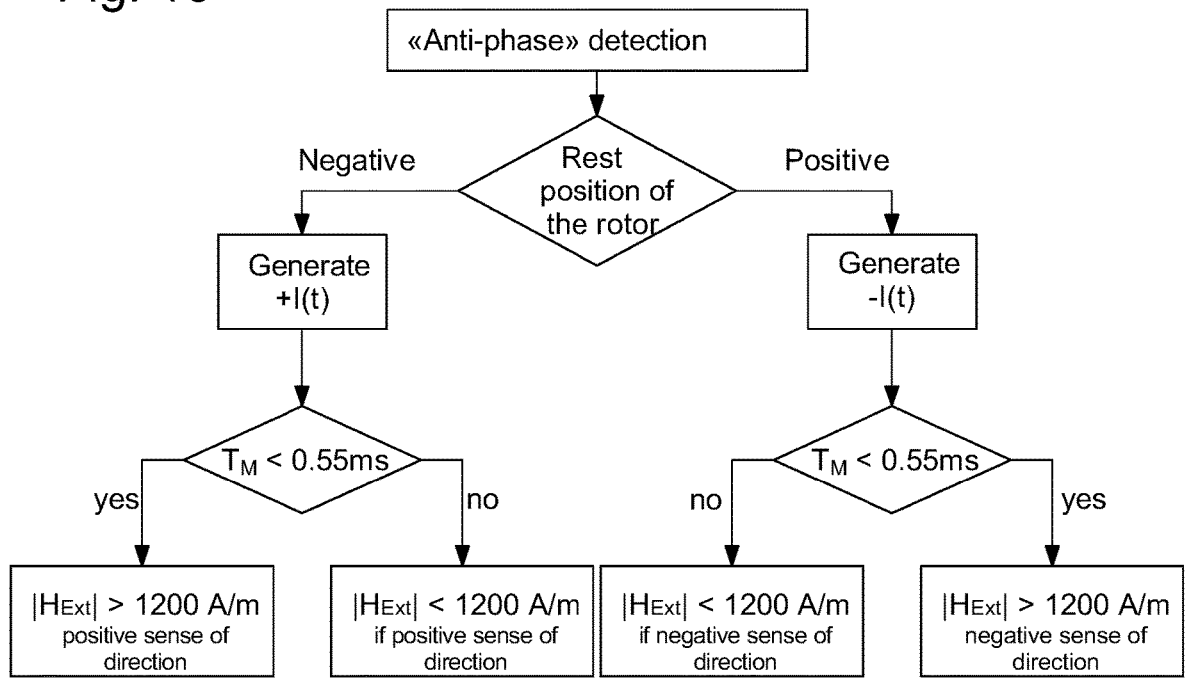
FIG. 16 is a diagram disclosing a method for detecting a given external magnetic field for an anti-phase electrical pulse.

To exploit the results and findings given before, the control circuit 20 of the stepper motor, in particular the circuit 24 for detecting an external magnetic field and more specifically the circuit 36 for processing the measured rise time are arranged, in a main embodiment, so as to enable the implementation of a method for detecting an external magnetic field, two main modes of which are given in a diagram form respectively in FIGS. 15 and 16.

FIG. 15 gives the steps of a variant of a first implementation of a method for detecting an external magnetic field in which the electrical detection pulse is in-phase with the rest position of the rotor, while FIG. 16 gives the steps of a variant of a second implementation of the detection method according to the invention, in which the electrical detection pulse is in anti-phase with the rest position of the rotor.

In the first "in-phase" detection mode, the detection method first determines the rest position of the permanent magnet. This information is generally known in the control circuits of a bipolar magnet stepper motor, because the electrical driving pulses should be in-phase with the rest position of the permanent magnet. Afterwards, an in-phase electrical detection pulse (detection pulse) is generated, having for example a duration between 1.5 ms and 2.0 ms. As of the beginning of the detection pulse, the circuit for measuring the current $I_B(t)$ is active and the timer 32 is triggered at the beginning of the detection pulse, so as to be able to measure the rise time $T_M$ of the current $I_B(t)$ up to a value substantially equal to that of a reference current $I_{Ref}$ (which as a given absolute reference value). In the described variant, the reference current has an absolute reference value selected between 0.10 mA and 0.30 mA, preferably between 0.15 mA and 0.25 mA, for example 0.20 mA. Once the rise time is measured, this information has to be processed to detect the presence a given external magnetic field $H_{Ext}$, more specifically an external magnetic field that generates in the isthmi a given external magnetic flux $F_H$ (which therefore passes throughout the isthmi) having a given sense of direction, namely a positive sense of direction when the detection pulse has a negative polarity and a negative sense of direction when the polarity of the detection pulse is positive.

Various variants are possible for processing the rise time $T_M$ by the processing circuit 36. In the variant given in FIG. 15, the processing circuit is intended to detect an external magnetic field that generates in the isthmi 12a & 12b of the stator 4 a magnetic flux $F_H$ having at least one given strength.

In the table of FIG. 14, values for an external magnetic field $H_{Ext}$ have been given in the particular case of an external field propagating parallel to the plane of the stator and generally perpendicular to the direction of alignment of the two isthmi. In this particular case, to determine the corresponding magnetic fluxes $F_H$ which are decisive for the detection method according to the invention, the curve 50 of FIG. 8 gives the relationship between these two physical variables for the considered example. To detect an external magnetic field with a relatively high strength, equivalent when considering the flux in the isthmi to an external magnetic field according to the aforementioned particular case having more than 1,000 A/m, more specifically at least a value of 1,200 A/m with regards to the values of the table of FIG. 14, the processing circuit 36 determines whether the rise time $T_M$ is longer than a first reference duration, namely 0.9 ms in the considered example. If so, this first detection mode concludes, for the positive rest position, on the presence of a negative external magnetic field having a strength higher than a first minimum value, namely at least a strength of 1,200 A/m for the mentioned particular case or for an equivalent external magnetic field with regards to the external magnetic flux generated I the two isthmi of the stator, and, for the negative rest position, in the presence of a positive external magnetic field having a strength higher than a second minimum value, namely a strength of at least 1,200 A/m for the mentioned particular case or for an equivalent external magnetic field. If not, this first detection mode concludes, on the contrary, for the positive rest position and the negative rest position.

In the second "anti-phase" detection mode, the detection method also determines at first the rest position of the permanent magnet/of the rotor. Afterwards, a detection pulse is generated in anti-phase, having for example a duration between 1.5 ms and 2.0 ms. The rise time $T_M$ of the current $I_B(t)$ up to the reference current $I_{Ref}$ is measured. Once the rise time is measured, this information is processed to detect the presence of a given external magnetic field $H_{Ext}$, more exactly an external magnetic field which generates in the isthmi an external magnetic flux $F_H$ having a given sense of direction, namely a positive sense of direction when the detection pulse has a negative polarity and a negative sense of direction when the polarity of the detection pulse is positive (like in the first "in-phase" detection mode). In the variant given in FIG. 16, the processing circuit seeks to detect an external magnetic field that generates in the isthmi 12a & 12b of the stator 4 a magnetic flux $F_H$ having at least a given strength, substantially equal to that one selected for the first detection mode. To this end, the processing circuit 36 determines whether the rise time $T_M$ is shorter than a second reference duration, namely 0.55 ms in the considered example. If so, this second detection concludes in the same manner as the first detection mode; either, for the positive rest position, on the presence of a negative external magnetic field having a strength higher than a first minimum value, equal to a strength of 1,200 A/m for the mentioned particular case or for an equivalent external magnetic field with regards to the external magnetic flux generated in the two isthmi of the stator; or, for the negative rest position, in the presence of a positive external magnetic field having a strength higher than a second minimum value, equal to a strength of 1,200 A/m for the mentioned particular case or for an equivalent external magnetic field. If not, this second detection mode concludes, on the contrary, for the positive rest position and the negative rest position.

Hence, one could notice, as already mentioned, that in the absence of any information on the sense of direction of the external magnetic flux in the isthmi of the stator, a method for detecting an external magnetic field generating in the isthmi an external magnetic flux with a given strength, preferably comprises, to enable the detection of this external magnetic field regardless of its sense of direction in these isthmi, a first phase, according to the first detection mode or the second detection mode, with the rotor in its positive or negative rest position and a second phase, also according to the first detection mode or the second detection mode, with the rotor respectively in its negative or positive rest position.

In general, the circuit 36 for processing the rise time $T_M$ is arranged so as to be able to determine, at least within a useful range of values, either approximately a value/strength of an external magnetic field or of its flux passing, where appropriate, through the two isthmi of the stator according to a direction perpendicular to the direction of alignment of these two isthmi, or whether the value/strength of said external magnetic field or of its flux passing, where appropriate, through the two isthmi according to said direction is higher than a reference value. The variants given in FIGS. 15 and 16 relate to the aforementioned second case. As regards the aforementioned first case, the table of FIG. 14 may be used, either by performing linear approximation between two values of the table to define intermediate values, or by determining a curve or a function giving the values of the external magnetic field $H_{Ext}$ as a function of the rise time $T_M$.

In a particular variant, the circuit for processing the rise time is arranged so as to be able to determine, at least within the useful range of values, whether the value of said external magnetic field or of its flux passing, where appropriate, through the two isthmi according to the aforementioned direction is within a specific range of values among a plurality of specific ranges of given values that succeed one another.

In the previously-described detection modes, the circuit for processing the rise time is arranged so as to be also able to determine the direction of the external magnetic field passing, where appropriate, through the two isthmi according to the aforementioned direction.

In a first advantageous variant, the circuit for detecting an external magnetic field is arranged so as to generate one or more detection pulse(s) in anti-phase with the rest position of the rotor, namely a negative electrical pulse when the rotor is in the positive rest position and positive electrical pulse when the rotor is in the negative rest position, so that the detection of the external magnetic field cannot cause an advance of the rotor by one step, since the electrical pulses in anti-phase are not driving pulses.

In a second advantageous variant, the circuit for detecting an external magnetic field is arranged so as to generate one or more detection pulse(s) in-phase with the rest position of the rotor, namely a positive electrical pulse when the rotor is in the positive rest position and a negative electrical pulse when the rotor is in the negative rest position. It is provided for the in-phase electrical pulse to have a duration selected so as to enable the detection of the external magnetic field, this selected duration being too short for the stepper motor to be able to advance by one step.

The invention claimed is:

1. An electronic control circuit (20) of a stepper-type motor (2), the motor comprising a rotor (3) provided with a permanent magnet (6), which is bipolar and has a magnetisation axis perpendicular to the axis of rotation (7) of this rotor, and a stator (4) which defines a magnetic circuit, an opening (8) forming a housing for the permanent magnet, two isthmi (12a & 12b) at the periphery of the opening and diametrically opposed in a first direction (14) perpendicular to the axis of rotation, and two rest positions for the rotor in which the permanent magnet is oriented in a second direction (16), angularly offset from the first direction, respectively in both senses of direction;

the permanent magnet generating, in the two rest positions, a first magnetic flux (FA) passing through the two isthmi respectively in both senses of direction, a first rest position corresponding to a positive sense of direction and the second rest position corresponding to a negative sense of direction of the first magnetic flux;

the motor further comprising a coil (18) mounted on the magnetic circuit so as to be able to generate, when supplied with a positive electrical pulse ($+I_B$ (t)) or a negative electrical pulse ($-I_B$ (t)), a second magnetic flux passing through the two isthmi respectively in said positive sense of direction or in said negative sense of direction;

the electronic control circuit determines the position of the rotor at rest, from among said first and second rest positions, and includes an electrical pulse generator (22) that is arranged to selectively supply the coil with positive and negative electrical pulses;

wherein the electronic control circuit (20) further comprises a circuit (24) for detecting an external magnetic field formed by a circuit (26) for measuring said electrical current, a circuit (28) for comparing the measured electrical current with a reference current ($I_{Ref}$), a time measurement circuit (32) arranged to measure a rise time (TM) between triggering of one of said electrical pulses and the next moment in time when the electrical current flowing in the coil reaches the reference current, and a circuit (36) for processing the rise time, this circuit being arranged to determine whether the measured rise time indicates the presence of an external magnetic field ($H_{Ext}$) passing through the two isthmi.

2. The electronic control circuit according to claim 1, wherein the two isthmi of the motor are arranged so that the first magnetic flux and the second magnetic flux pass through the two isthmi primarily according to a third direction (40) which is orthogonal to the first direction.

3. The electronic control circuit according to claim 1, wherein the circuit (32) for processing the rise time ($T_M$) is arranged to determine, at least within a range of values, either approximately a strength of the external magnetic field or of the flux of this external magnetic field passing, where appropriate, through the two isthmi, or whether the strength of the external magnetic field or of its flux passing, where appropriate, through the two isthmi is higher than a given minimum value.

4. The electronic control circuit according to claim 3, wherein the circuit (32) for processing the rise time ($T_M$) is arranged to determine, at least within the range of values, whether the strength of said external magnetic field or of its flux passing, where appropriate, through the two isthmi is within a specific range of values among a plurality of specific ranges of given values that succeed one another.

5. The electronic control circuit according to claim 1, wherein the circuit (24) for detecting an external magnetic field is arranged so as to allow determining the sense of direction of this external magnetic field passing, where appropriate, through the two isthmi.

6. The electronic control circuit according to claim 1, wherein it is arranged so as to detect the presence of an external magnetic field, so as to generate an electrical pulse in anti-phase with the rest position of the rotor, a negative electrical pulse when the rotor is in the positive rest position and a positive electrical pulse when the rotor is in the negative rest position, so that the detection of the external magnetic field cannot cause an advance of the rotor by one step.

7. The electronic control circuit according to claim 3, wherein it is arranged, for detecting the presence of an external magnetic field, so as to generate an electrical pulse in anti-phase with the rest position of the rotor, a negative electrical pulse when the rotor is in the positive rest position and a positive electrical pulse when the rotor is in the negative rest position, so that the detection of the external magnetic field cannot cause an advance of the rotor by one step.

8. The electronic control circuit according to claim 1, wherein it is arranged, for detecting the presence of an external magnetic field, so as to generate an electrical pulse in-phase with the rest position of the rotor, a positive electrical pulse when the rotor is in the positive rest position and a negative electrical pulse when the rotor is in the negative rest position; and wherein said in-phase pulse has a duration selected so as to enable the detection of the external magnetic field, the selected duration not allowing the stepper motor to advance by one step.

9. A horological movement comprising the stepper-type motor (2) and the electronic control circuit (20) according to claim 1, the motor comprising the rotor (3) provided with the bipolar permanent magnet (6), having the magnetisation axis perpendicular to the axis of rotation (7) of this rotor, and the stator (4) which defines the magnetic circuit, the opening (8) forming the housing for the permanent magnet, two isthmi (12a & 12b) at the periphery of the opening and diametrically opposed in the first direction (14) perpendicular to the axis of rotation, and two rest positions for the rotor in which the permanent magnet is oriented in the second direction (16), angularly offset from the first direction, respectively in both senses of direction; the permanent magnet generating in the two rest position the first magnetic flux (FA) passing through the two isthmi in both senses of direction respectively, the first rest position corresponding to the positive sense of direction and the second rest position corresponding to the negative sense of direction of the first magnetic flux; the motor further comprising the coil (18) mounted on the magnetic circuit to generate, when supplied with the positive electrical pulse (+$I_B$ (t)) or the negative electrical pulse (-$I_B$ (t)), the second magnetic flux passing through the two isthmi respectively in said positive sense of direction or in said negative sense of direction.

10. A horological movement comprising the stepper-type motor (2) and the electronic control circuit (20) according to claim 3, the motor comprising the rotor (3) provided with the bipolar permanent magnet (6), having the magnetisation axis perpendicular to the axis of rotation (7) of this rotor, and the stator (4) which defines the magnetic circuit, the opening (8) forming the housing for the permanent magnet, two isthmi (12a & 12b) at the periphery of the opening and diametrically opposed in the first direction (14) perpendicular to the axis of rotation, and two rest positions for the rotor in which the permanent magnet is oriented in the second direction (16), angularly offset from the first direction, respectively in both senses of direction;

the permanent magnet generating in the two rest position the first magnetic flux (FA) passing through the two isthmi in both senses of direction respectively, the first rest position corresponding to the positive sense of direction and the second rest position corresponding to the negative sense of direction of the first magnetic flux; the motor further comprising the coil (18) mounted on the magnetic circuit so as to be able to generate, when supplied with the positive electrical pulse (+$I_B$ (t)) or the negative electrical pulse (-$I_B$ (t)), the second magnetic flux passing through the two isthmi respectively in said positive sense of direction or in said negative sense of direction.

11. A watch comprising the horological movement according to claim 9.

12. A watch comprising the horological movement according to claim 10.

13. A method for detecting an external magnetic field in which the stepper-type motor (2), in particular a timepiece motor, is located, controlled by the electronic control circuit (20) according to claim 1, comprising the following steps of:
determining the rest position of the rotor (3), namely whether the rotor is in its positive rest position or in its negative rest position;
generating said electrical detection pulse ($I_B$ (t));
If the polarity of the electrical pulse is in phase with the rest position of the rotor, determining whether said rise time is longer than the first reference time; and if the polarity of the electrical detection pulse is in anti-phase with the rest position of the rotor, determining whether said rise time is shorter than a second reference duration;

If the polarity of the electrical pulse is negative and if the rise time meets one of the two conditions of the previous step, concluding on the presence of said external magnetic field ($H_{Ext}$) having said positive sense of direction and a strength higher than a given first minimum value; and if the rest position of the rotor is positive and if the rise time meets one of the two conditions of the previous step, concluding on the presence of said external magnetic field having a negative sense of direction and a strength higher than a given second minimum value.

14. The detection method according to claim 13, further comprising a first phase, in which said steps are performed when the rotor is in its positive or negative rest position, and a second phase taking place after the motor has performed one motor step and in which said steps are performed again while the rotor is respectively in its negative or positive rest position.

\* \* \* \* \*